(12) United States Patent
Okubo et al.

(10) Patent No.: US 11,598,908 B2
(45) Date of Patent: Mar. 7, 2023

(54) INTERFERENCE FILTER MODULE

(71) Applicant: KOHOKU KOGYO CO., LTD., Nagahama (JP)

(72) Inventors: Toshihisa Okubo, Nagahama (JP); Takashi Kato, Nagahama (JP)

(73) Assignee: KOHOKU KOGYO CO., LTD., Nagahama (JP)

( * ) Notice: Subject to any disclaimer, the term of this patent is extended or adjusted under 35 U.S.C. 154(b) by 231 days.

(21) Appl. No.: 16/767,832

(22) PCT Filed: Nov. 6, 2018

(86) PCT No.: PCT/JP2018/041769
§ 371 (c)(1),
(2) Date: May 28, 2020

(87) PCT Pub. No.: WO2019/107120
PCT Pub. Date: Jun. 6, 2019

(65) Prior Publication Data
US 2020/0379151 A1    Dec. 3, 2020

(30) Foreign Application Priority Data
Dec. 1, 2017   (JP) .............................. JP2017-231438

(51) Int. Cl.
*G02B 5/28* (2006.01)
*G02B 6/293* (2006.01)
(Continued)

(52) U.S. Cl.
CPC ................. *G02B 5/28* (2013.01); *G02B 5/30* (2013.01); *G02B 6/2937* (2013.01); *G02B 6/29361* (2013.01); *G02B 6/32* (2013.01)

(58) Field of Classification Search
CPC .......................... G02B 6/29361; G02B 6/2937
See application file for complete search history.

(56) References Cited

U.S. PATENT DOCUMENTS 5,781,332 A    7/1998   Ogata
2001/0028765 A1   10/2001   Toratani et al.

FOREIGN PATENT DOCUMENTS

JP    H09178970 A    7/1997
JP    2001183542 A    7/2001
(Continued)

OTHER PUBLICATIONS

International Search Report (PCT/ISA/210) and translation and Written Opinion (PCT/ISA/237) dated Jan. 29, 2019, by the Japanese Patent Office as the International Searching Authority for International Application No. PCT/JP2018/041769.

*Primary Examiner* — Omar R Rojas
(74) *Attorney, Agent, or Firm* — Buchanan Ingersoll & Rooney PC

(57) ABSTRACT

An interference filter module comprises two optical fiber collimators arranged on an optical axis so as to be opposed to each other, interference filters, and a casing including a main body portion and filter holding portions to be mounted into the main body portion, which are configured to hold the interference filters. Two interference filters including a kth filter when counted from a front end and a k-th filter when counted from a rear end are determined as a k-th set. The two interference filters of the k-th set are accommodated in two filter holding portions, each of which is a k-th holding portion when counted from the front end and the rear end, respectively. The two filter holding portions have rotation axes in directions orthogonal to a fore-and-aft direction and are rotatably held by the casing. The rotation axes of the filter holding portions are orthogonal to each other.

7 Claims, 9 Drawing Sheets

(51) Int. Cl.
    *G02B 6/32*         (2006.01)
    *G02B 5/30*         (2006.01)

(56) References Cited

FOREIGN PATENT DOCUMENTS

| | | |
|---|---|---|
| JP | 2003329841 A | 11/2003 |
| JP | 2012189948 A | 10/2012 |
| WO | 03096496 A1 | 11/2003 |

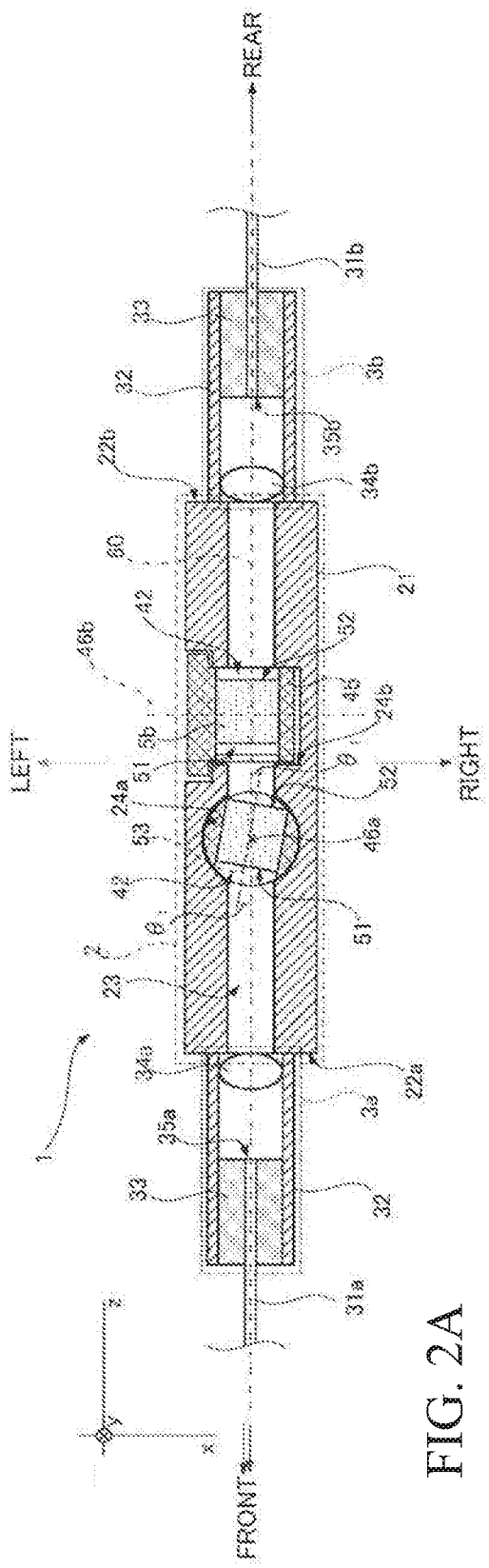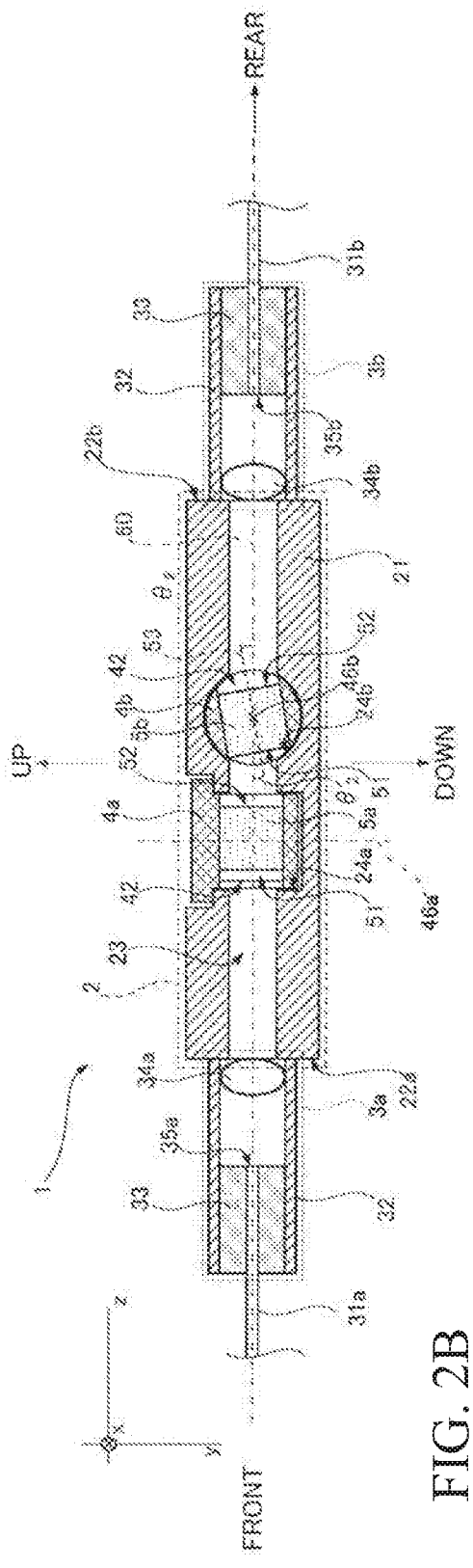
FIG. 2A
FIG. 2B

INTERFERENCE FILTER MODULE

TECHNICAL FIELD

The present invention relates to an interference filter module including interference filters between optical fiber collimators arranged so as to be opposed to each other, which is configured to selectively transmit light in a predetermined wavelength band.

BACKGROUND ART

An interference filter serving as an optical element has a structure in which a thin film made of, for example, a dielectric is laminated on a substrate made of, for example, glass. This interference filter transmits light in a specific wavelength band and reflects light in other wavelength bands. The interference filter module has a basic configuration in which the interference filter is arranged so as to be located on an optical axis formed between a pair of optical fiber collimators opposed to each other. In general, in the interference filter module, the interference filter is held in a state in which a position thereof is adjusted inside a casing having a hollow cylindrical shape. The optical fiber collimators are connected to both ends of the casing, respectively. The interference filter module described above is provided, for example, on an extension line of an optical fiber serving as an optical signal transmission path in an optical communication network, and is used to shape a degraded signal waveform or remove noise light.

A basic interference filter module including one interference filter arranged between the collimators cannot improve efficiency of transmission of a wavelength in a target wavelength band. Thus, in some cases, a plurality of interference filters are arranged in series so as to improve a characteristic of selectively transmitting a wavelength in a target wavelength band (hereinafter also referred to as "wavelength selection characteristic"). Further, in the interference filter module, a light incident surface of the interference filter is inclined with respect to an optical axis. With the inclination of the light incident surface, when light unidirectionally traveling from one of the optical fibers is incident on the interference filter, so-called "optical feedback", specifically, a phenomenon that a part of the light is specularly reflected to be incident on this optical fiber again is prevented. However, when the light incident surface of the interference filter is inclined with respect to the optical axis, a difference in light intensity is generated between a P-wave and an S-wave respectively oscillating in directions orthogonal to each other. Specifically, an insertion loss has polarization dependence. Further, polarization mode dispersion in which a difference in propagation speed is generated between the P-wave and the S-wave occurs. In an interference filter module using two interference filters for the purpose of improvement of the wavelength selection characteristic, influences of the polarization dependence and the polarization mode dispersion increase. Thus, in Patent Document 1, there is described an interference filter module in which two interference filters are arranged so that light incident surfaces thereof are orthogonal to each other and are inclined with respect to the optical axis. With the arrangement of the interference filters, a relationship between the P-wave and the S-wave after these waves transmit through a first one of the interference filters is interchanged through a second one of the interference filters so that the polarization dependence and the polarization mode dispersion are reduced while the wavelength selection characteristic is improved.

CITATION LIST

Patent Document

Patent Document 1

Japanese Patent Application Laid-Open (kokai) No. 9-178970

SUMMARY OF THE INVENTION

Technical Problem

In the interference filter module described in Patent Document 1, the two interference filters are arranged in series, and directions of the inclination of the optical incident surfaces of the two interference filters with respect to the optical axis are set orthogonal to each other. One of the interference filters is held so that the light incident surface has a predetermined inclination angle (hereinafter also referred to as "light incident angle") with respect to the optical axis based on an internal shape of the casing, and another one of the interference filters is held in a holder having a cylindrical shape, which is pivotably mounted into the casing.

The wavelength selection characteristic of the interference filter depends on a film thickness of an interference film and the inclination angle of the light incident surface with respect to the optical axis. In the invention described in Patent Document 1, however, the light incident angle of the one interference filter is fixed. Thus, when the interference film of the interference filter has an error, a target wavelength selection characteristic cannot be obtained. In other words, film thickness control with extremely high accuracy is required for the interference filters. It is apparent that a structure of holding the interference filters so that each of the interference filters has a predetermined light incident angle with high accuracy is required also for the casing. Thus, the conventional interference filter module has a problem in that manufacturing cost for the interference filters and the casing increases and it becomes difficult to provide the interference filter module at low cost.

Thus, the present invention has an object to provide an interference filter module having reduced polarization dependence and polarization mode dispersion as well as an excellent wavelength selection characteristic at a lower cost.

Solution to Problem

In order to achieve the above-mentioned object, according to one embodiment of the present invention, there is provided an interference filter module comprising: a first optical fiber collimator and a second optical fiber collimator, which have a fore-and-aft direction as a direction of an optical axis and are arranged at a front end and a rear end of a casing so as to be located on the optical axis and opposed to each other; and 2n interference filters arranged inside the casing so as to be located on the optical axis where n is a natural number, wherein, the casing includes: a main body portion having a cylindrical shape; and 2n filter holding portions, each being configured to hold a corresponding one of the interference filters, which are to be mounted into the main body portion, each of the interference filters includes a substrate and an interference film laminated on the substrate, when k is a natural number equal to or smaller than n, two interference filters including a k-th interference filter when counted from the front end toward the rear end of the casing and a k-th interference filter when counted from the rear end toward the front end of the casing are determined as a k-th set among the 2n interference filters, the two interference filters of the k-th set are respectively accommodated in one of the filter holding portions, which is a k-th filter holding portion when counted from the front end toward the rear end of the casing, and in another one of the filter holding portions, which is a k-th filter holding portion when counted from the rear end toward the front end of the casing, and the two filter holding portions corresponding to the k-th filter holding portion when counted from the front end of the casing and the k-th filter holding portion when counted from the rear end of the casing have rotation axes in directions orthogonal to the fore-and-aft direction and are held rotatably in the casing, and the rotation axes of the two filter holding portions are orthogonal to each other.

In the interference filter module, the two interference filters of the k-th set may be arranged so that film surfaces of the interference films of the two interference filters face each other. Further, it is preferred that, the interference filter module comprise the two interference filters which are arranged so that the film surfaces of the two interference filters are located at equal distances apart from a beam waist position on an optical path formed between the first optical fiber collimator arranged at the front end and the second optical fiber collimator arranged at the rear end, which are opposed to each other. In addition, it is more preferred that, in interference filter module, the two interference filters be arranged so that the film surfaces of the two interference filters are located as close as possible to the beam waist position while preventing the two interference filters from being in contact with each other.

Effects of the Invention

The interference filter module of the present invention has reduced polarization dependence and polarization mode dispersion as well as an excellent wavelength selection characteristic, and can be provided at low cost.

BRIEF DESCRIPTION OF THE DRAWINGS

FIG. 2A and FIG. 2B are sectional views, each for illustrating an internal structure of the selection wavelength filter according to the first embodiment.

DESCRIPTION OF THE EMBODIMENTS

Figure 1A:
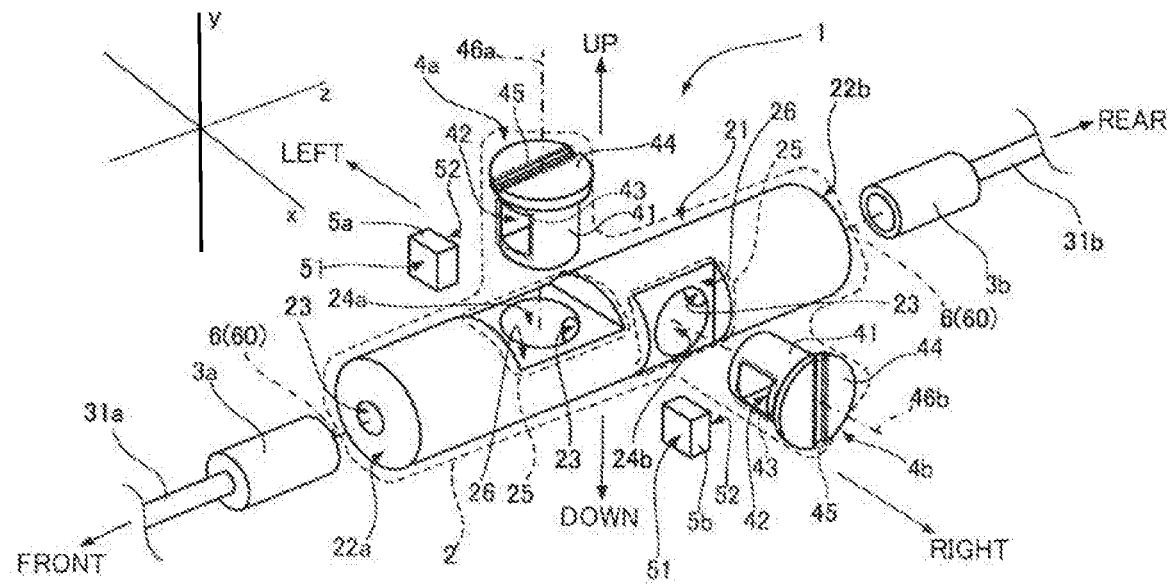
FIG. 1A and FIG. 1B are perspective views, each for illustrating a structure of a wavelength selection filter according to a first embodiment of the present invention.

Embodiments of the present invention are described below with reference to the accompanying drawings. In the drawings referred to below, the same or similar portions and components are denoted by the same reference symbols, and overlapping description thereof is omitted in some cases. The portion or component denoted by the reference symbol in one of the drawings may be illustrated without the reference symbol in other drawings when the illustration thereof with the reference symbol is not necessary.

First Embodiment

An interference filter module according to each of the embodiments of the present invention includes an even number of interference filters, which are arranged in series so as to be located on an optical axis between optical fiber collimators arranged so as to be opposed to each other. Further, a normal direction of light incident and exit surfaces of each of the interference filters is inclined with respect to the optical axis. More specifically, a direction of the optical axis is set to match with a fore-and-aft direction. At the same time, when n represents a natural number, 2n interference filters are provided. A k-th (k is a natural number, which satisfies: k≤n) interference filter, which is counted backward from a foremost interference filter, and a k-th interference filter, which is counted forward from a last interference filter, are determined as one set. Light incident surfaces of the interference filters of each set are arranged so as to be orthogonal to the fore-and-aft direction, and each of the interference filters is held so as to be rotatable about an axis, where the axes of the interference filters are orthogonal to each other. Hereinafter, the simplest interference filter module, which includes two interference filters and has a basic configuration common to the embodiments, is described as a first embodiment.

Figure 1B:
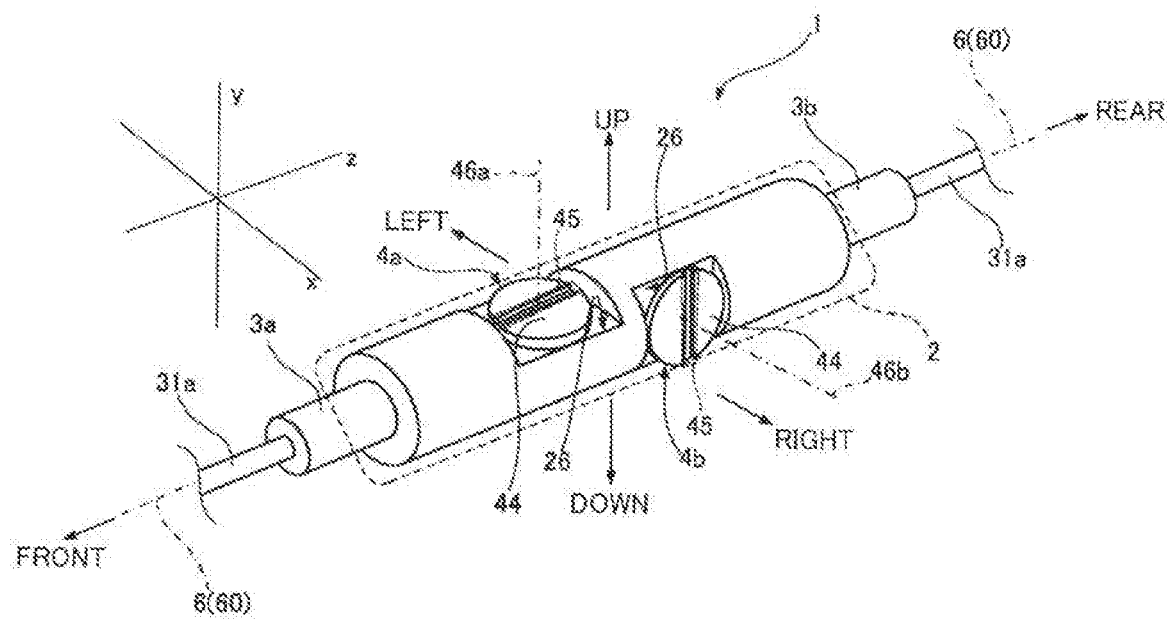

FIG. 1A and FIG. 1B are views, each for illustrating an interference filter module 1 according to the first embodiment. FIG. 1A is an exploded perspective view of the interference filter module 1, and FIG. 1B is a perspective view for illustrating the interference filter module 1 in an assembled state. As illustrated in FIG. 1A, the interference filter module 1 according to the first embodiment includes a casing 2, two interference filters (5a, 5b), and two optical fiber collimators (3a, 3b). The casing 2 includes a casing main body portion (hereinafter also referred to as "main body portion 21") having a cylindrical shape and two filter holding portions (4a, 4b) to be mounted into the main body portion 21. The optical fiber collimators (3a, 3b) are respectively connected to both ends (22a, 22b) of the main body portion 21 having the cylindrical shape so as to be opposed to each other. One interference filter (5a, 5b) is held in each filter holding portion (4a, 4b). For convenience of the description, a direction of a cylinder axis 6 of the main body portion 21 having the cylindrical shape is regulated as a fore-and-aft direction. A z axis is set so as to be parallel to the fore-and-aft direction, and a three-dimensional xyz orthogonal coordinate system is set. At the same time, an x-axis direction is set so as to match with a right-and-left direction, and a y-axis direction is set so as to match with an up-and-down direction. Further, FIG. 1A is given as a perspective view when the interference filter module 1 is viewed from an upper right front side, and each of the right-and-left direction, the up-and-down direction, and the fore-and-aft direction is defined as illustrated in FIG. 1A and FIG. 1B.

Next, with reference to FIG. 1A, a configuration of the interference filter module 1 according to the first embodiment is specifically described. First, out of the two filter holding portions (4a, 4b), the filter holding portion 4a on the front side is configured to fix the interference filter 5a to the main body portion 21 while allowing the interference filter 5a to be rotated about the y axis. The filter holding portion 4b on the rear side is configured to fix the interference filter 5b to the main body portion 21 while allowing the interference filter 5b to be rotated about the x axis. Further, each of the filter holding portions (4a, 4b) has such a shape that a head portion 44 having a disc-like shape with a diameter larger than a diameter of a trunk portion 41 having a cylindrical shape is formed on an end surface of the trunk portion 41.

A hole (hereinafter also referred to as "filter accommodating hole 42") passing in a direction orthogonal to a cylinder axis (46a, 46b) of the trunk portion 41 is formed in a side surface of the trunk portion 41 having the cylindrical shape so as to accommodate the interference filter (5a, 5b) therein. In this example, each of openings 43 of the filter accommodating portion 42 has a rectangular shape in conformity with a shape of the interference filter (5a, 5b), which is a cuboidal shape or a rectangular flat plate-like shape. The interference filter (5a, 5b) is inserted into the filter accommodating portion 42 so that its own light incident and exit surfaces (51, 52) are respectively exposed through the rectangular openings 43 of the filter accommodating portion 42.

The main body portion 21 has a hollow cylindrical shape. A hole (hereinafter also referred to as "longitudinal hole 23") having a circular cross section, which passes in the fore-and-aft direction, is formed through both of the front and rear end surfaces (22a, 22b) to extend in a direction matching with the cylinder axis 6. The optical fiber collimators (3a, 3b) are connected to the front and rear end surfaces (22a, 22b) of the main body portion 21 by a method such as welding so that optical axes 60 thereof become coaxial. As a result, an optical path along the optical axis 60 is formed inside the longitudinal hole 23. The description is continued below assuming that the cylinder axis 6 of the main body portion 21 is coaxial with the optical axis 60.

Two circular holes (hereinafter also referred to as vertical holes (24a, 24b)) are formed in the main body portion 21 so as to be open in the up-and-down direction as a depth direction and be open in the right-and-left direction as a depth direction, respectively. The above-mentioned longitudinal hole 23 passing in the fore-and-aft direction has openings on inner surfaces of the vertical holes (24a, 24b). In the example described herein, each of the vertical holes (24a, 24b) has a closed end. However, each of the vertical holes (24a, 24b) may be a through hole. The trunk portion 41 of the filter holding portion (4a, 4b) is inserted into the vertical hole (24a, 24b). When the trunk portion 41 of the filter holding portion (4a, 4b) is inserted into the vertical hole (24a, 24b), a side surface of the trunk portion 41 is slidably brought into contact with an inner surface of the vertical hole (24a, 24b). As a result, the filter holding portion (4a, 4b) can be smoothly rotated about the axis (46a, 46b). Further, in the interference filter module 1 according to the first embodiment, regions 25, each including the vertical hole (24a, 24b) located at a center thereof, are cut out. Each of the cutout regions 25 has a flat surface 26. A normal direction of the flat surface 26 matches with an axis of the vertical hole (24a, 24b), which is open on the flat surface 26, that is, a direction of the cylinder axis (46a, 46b) of the trunk portion 41 of the filter holding portion (4a, 4b). With the arrangement described above, when the trunk portion 41 of the filter holding portion (4a, 4b) is inserted into the vertical hole (24a, 24b), as illustrated in FIG. 1B, a surface of the head portion 44 of the filter holding portion (4a, 4b) on the trunk portion 41 side (hereinafter referred to as "back surface") is brought into contact with the flat surface 26 of the main body portion 21. As a result, the filter holding portion (4a, 4b) is mounted into the main body portion 21 without any gap.

The filter holding portion (4a, 4b) has a groove 45 formed on a front surface side of the head portion 44 as a structure configured to rotate the trunk portion 41. When a tool such as a flathead screwdriver is inserted into the groove 45 under a state in which the filter holding portion (4a, 4b) is mounted into the main body portion 21 and the head portion 44 is rotated about the cylinder axis (46a, 46b) of the trunk portion 41, the light incident and exit surfaces (51, 52) of the interference filter (5a, 5b) mounted into the trunk portion 41 can be inclined at an arbitrary angle with respect to the optical axis 60. When the interference filter (5a, 5b) is fixed under the above-mentioned state, it is preferred that the head portion 44 of the filter holding portion (4a, 4b) be fixed to the flat surface 26 of the main body portion 21 by a method such as laser welding. In the interference filter module 1 according to the first embodiment, a mechanism configured to variably adjust the inclination of the interference filter (5a, 5b) with respect to the optical axis 60 and a holding structure for the interference filter (5a, 5b) with use of the filter holding portion (4a, 4b) are not limited to the configuration and the structure illustrated in FIG. 1A and FIG. 1B.

FIG. 2A and FIG. 2B are schematic views, each for illustrating an internal structure of the interference filter module 1 according to the first embodiment in an assembled state. FIG. 2A is a longitudinal sectional view for illustrating a zx plane containing the optical axis 60, and FIG. 2B is a longitudinal sectional view for illustrating a yz plane containing the optical axis 60. As illustrated in FIG. 2A and FIG. 2B, the optical fiber collimator (3a, 3b) includes a ferrule 33 and a collimate lens (34a, 34b), each of which being inside a sleeve 32 having a hollow cylindrical shape. The ferrule 33 holds an optical fiber (31a, 31b). The ferrule 33 and the collimate lens (34a, 34b) are held coaxially with the sleeve 32. The optical fiber (31a, 31b) has an open end (35a, 35b) on the casing 2 side. In this case, it is assumed that an optical signal propagating through the optical fiber 31a on the front side exits from the open end 35a of the optical fiber 31a as a light beam traveling rearward and the light beam then enters the open end 35b of the optical fiber 31b on the rear side. In the following description, the optical fiber collimator 3a on the front side, and the optical fiber 31a and the collimate lens 34a, which are included in the optical fiber collimator 3a, are respectively referred to as an input-side collimator 3a, an input-side fiber 31a, and an input-side lens 34a. The optical fiber collimator 3b on the rear side, and the optical fiber 31b and the collimate lens 34b, which are included in the optical fiber collimator 3b, are respectively referred to as an output-side collimator 3b, an output-side fiber 31b, and an output-side lens 34b. A straight line for connecting the open ends (35a-35b) of the input-side and output-side optical fibers (31a, 31b) to each other corresponds to the optical axis 60.

In the interference filter module 1 according to the first embodiment in the assembled state, the openings 43 of the filter accommodating portion 42 of each of the filter holding portions (4a, 4b) on the front side and on the rear side are arranged so as to face the openings of the longitudinal hole 23 inside the vertical hole (24a, 24b). As a result, the light beam traveling from the front side to the rear side along the optical axis 60 is transmitted through the interference filters (5a, 5b). Further, when the trunk portion 41 of the filter holding portion (4a, 4b), which is inserted into the vertical hole (24a, 24b), is rotated about the cylinder axis (46a, 46b), the light incident and exit surfaces (51, 52) of the interference filter (5a, 5b) are inclined with respect to the optical axis 60. An angle formed between a normal 53 of the light incident and exit surfaces (51, 52) of the interference filter 5a and the optical axis 60 is represented as an incident angle $\theta 1$. An angle formed between a normal 53 of the light incident and exit surfaces (51, 52) of the interference filter 5b and the optical axis 60 is represented as an incident angle $\theta 2$.

Figure 3A:
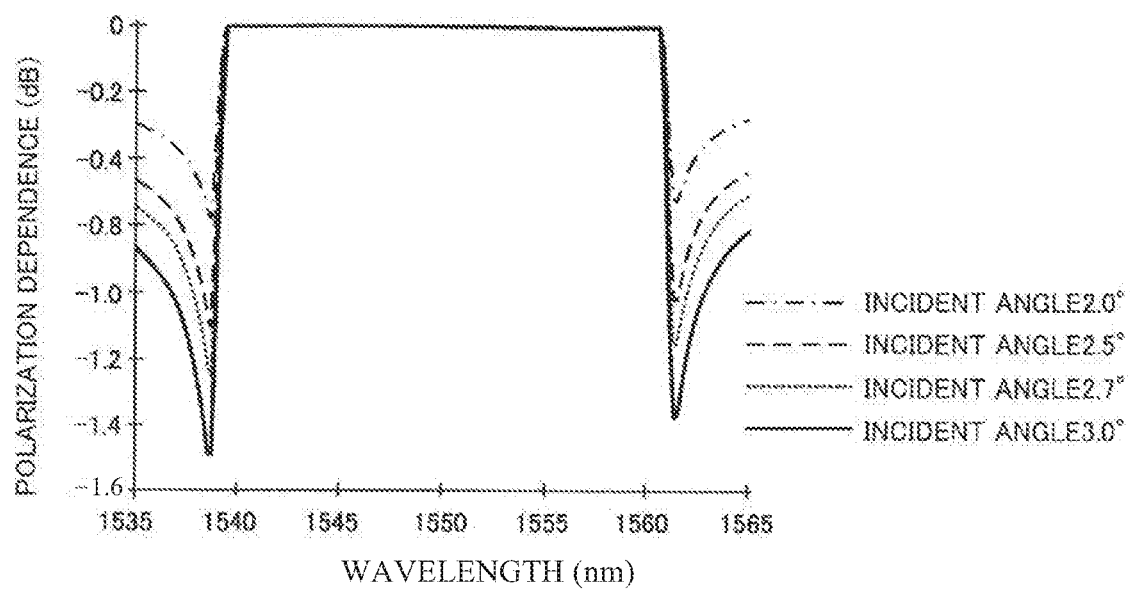
FIG. 3A is a graph for showing polarization dependence of the selection wavelength filter according to a comparative example.
Figure 3B:
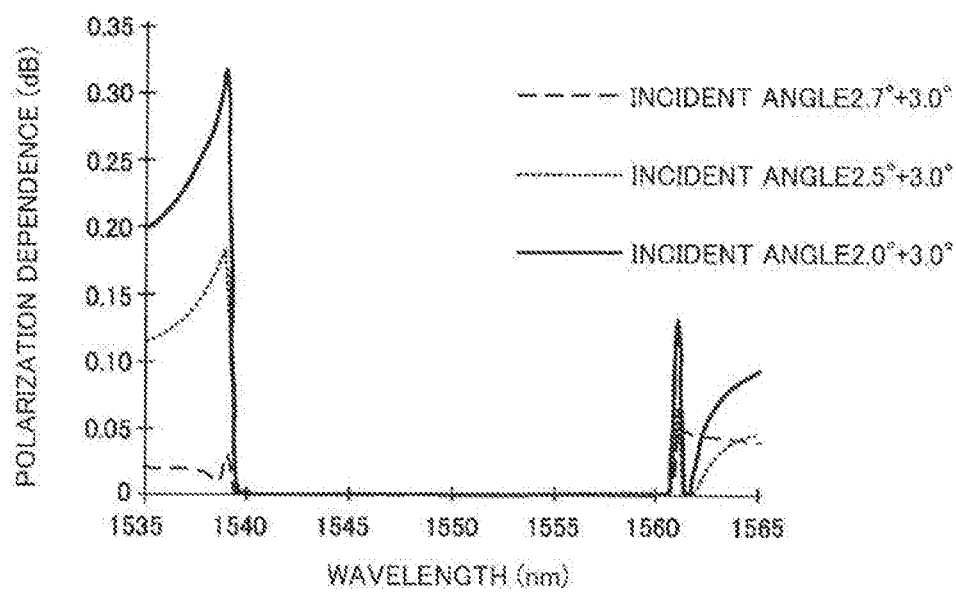
FIG. 3B is a graph for showing polarization dependence of the selection wavelength filter according to the first embodiment.
Figure 4A:
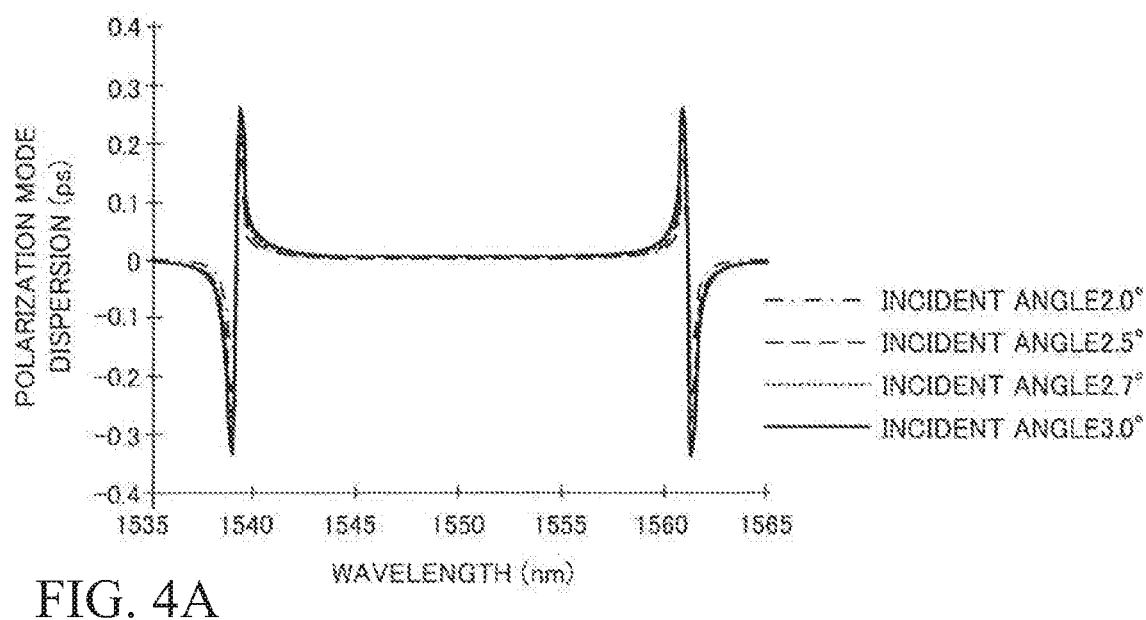
FIG. 4A is a graph for showing polarization mode dispersion of the selection wavelength filter according to a comparative example.

Next, polarization dependence and polarization mode dispersion of the interference filter module 1 according to the first embodiment are examined. In FIGS. 3A and 3B and FIGS. 4A and 4B, the polarization dependence and the polarization mode dispersion are shown as graphs. In FIG. 3A and FIG. 4A, polarization dependence and polarization mode dispersion of an interference filter module using one interference filter (hereinafter also referred to as "comparative example") are respectively shown. The graphs for showing characteristics of the comparative example have an intersection angle (hereinafter also referred to as "incident angle $\theta$") of the normal direction of the light incident surface of the interference filter and the optical axis as a parameter. Further, in FIG. 3B and FIG. 4B, the polarization dependence and the polarization mode dispersion of the first embodiment are respectively shown. The characteristic graphs of the polarization dependence and the polarization mode dispersion of the first embodiment have the incident angles ($\theta 1$, $\theta 2$) illustrated in FIG. 2A and FIG. 2B as parameters. Each of the interference filters used for the comparative example and the interference filter module 1 according to the first embodiment includes a layer of $SiO_2$ having a thickness of 33 μm and a layer of $Ta_2O_5$ having a thickness of 19 μm are sequentially laminated as an interference film on a quartz substrate having a thickness of 1.4 mm. Now, the characteristics of the polarization dependence and the polarization mode dispersion of the interference filter module 1 according to the first embodiment are described with reference to FIGS. 2A, 2B, 3A, 3B, 4A and 4B.

Figure 4B:
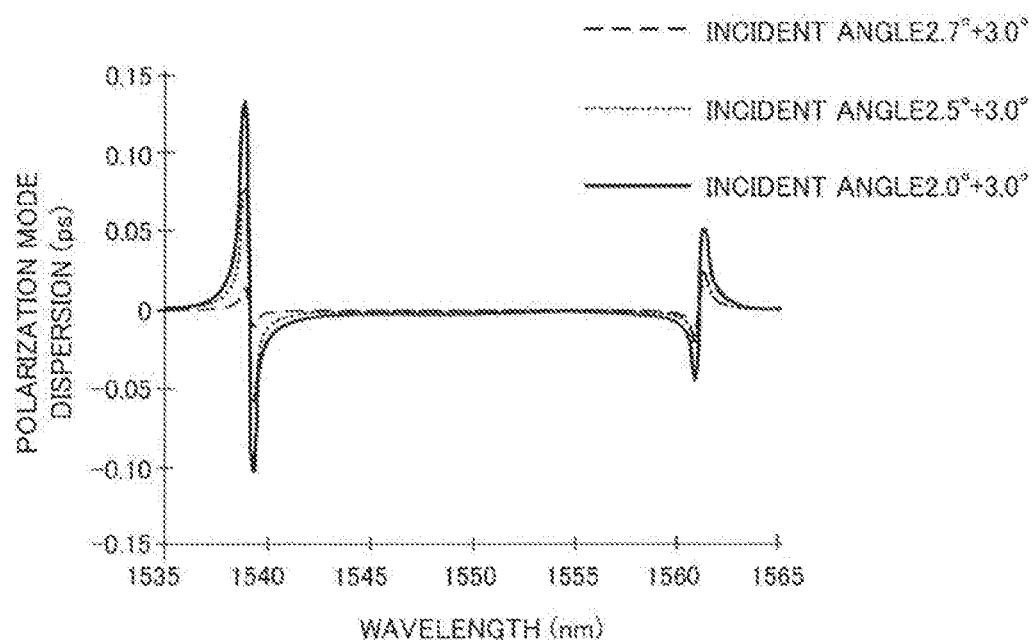
FIG. 4B is a graph for showing polarization mode dispersion of the selection wavelength filter according to the first embodiment.

As shown in FIG. 3A and FIG. 4A, it is understood that, in the comparative example, when the incident angle $\theta$ is set to 2.5 degree, 2.7 degree, and 3.0 degree, deterioration of the characteristics of the polarization dependence and the polarization mode dispersion proceeds as the incident angle $\theta$ increases. Meanwhile, in the interference filter module 1 according to the first embodiment, even when the incident angle $\theta 2$ of the interference filter 5b on the rear side is set to 3.0 degree, which is the same as the incident angle $\theta$ with which the characteristics of the polarization dependence and the polarization mode dispersion significantly deteriorate in the comparative example, as shown in FIG. 3B and FIG. 4B, the characteristics of the polarization dependence and the polarization mode dispersion can be improved in comparison to those of the comparative example by increasing the incident angle $\theta 1$ of the interference filter 5a on the front side toward 3.0 degree. It is apparent that, when the incident angles ($\theta 1$, $\theta 2$) of the two interference filters (5a, 5b) are the same ($\theta 1=\theta 2$), the characteristics are further improved. In each of the graphs of the characteristics of the interference filter module 1 according to the first embodiment, specifically, FIG. 3B and FIG. 4B, values represented on a vertical axis have a sign opposite to that of values of the comparative example. The reason is as follows. When the light beam is sequentially transmitted through the interference filters (5a, 5b), each of which being located on the front side and on the rear side, while traveling from the front side to the rear side, the first embodiment has a magnitude relationship of light transmission intensities or delays between the P-wave and the S-wave for each wavelength, which is inverse to that of the comparative example because the incident angle $\theta 2$ of the interference filter 5b on the rear side is larger than the incident angle $\theta 1$ of the interference filter 5a on the front side ($\theta 1<\theta 2$). In any case, in the interference filter module 1 according to the first embodiment, the incident angles ($\theta 1$, $\theta 2$) of the two interference filters (5a, 5b) are configured to be freely adjustable. Thus, the structure for fixing one of the interference filters (5a or 5b) with high accuracy is not required for the casing 2. Further, as illustrated in FIG. 3B and FIG. 4B, excellent polarization dependence and polarization mode dispersion characteristics are obtained even when both of the incident angles ($\theta 2$, $\theta 1$) are not perfectly the same. Thus, when the interference films of the interference filters (5b, 5a) have a variation in thickness, a target wavelength selection characteristic can be obtained by appropriately adjusting both of the incident angles ($\theta 2$, $\theta 1$).

Second Embodiment

In the first embodiment, the incident angles of the two interference filters can be set in an arbitrary manner. Thus, strict control of the thickness of the interference film of each of the interference filters and manufacture of the casing with extremely high processing accuracy are not required. Thus, the interference filter module having excellent polarization dependence characteristic and polarization mode dispersion characteristic can be provided at low cost. However, an original purpose of the use of the plurality of interference filters is improvement of the wavelength selection characteristic. Thus, for the interference filter module, this original purpose is required to be achieved at a higher level. However, it is found that the interference filter module using the plurality of interference filters, which is represented by the interference filter module 1 according to the first embodiment, has a problem in that it is difficult to obtain an improved wavelength selection characteristic due to an optical characteristic of the optical fiber collimators and the structure of each of the interference filters.

Figure 5:
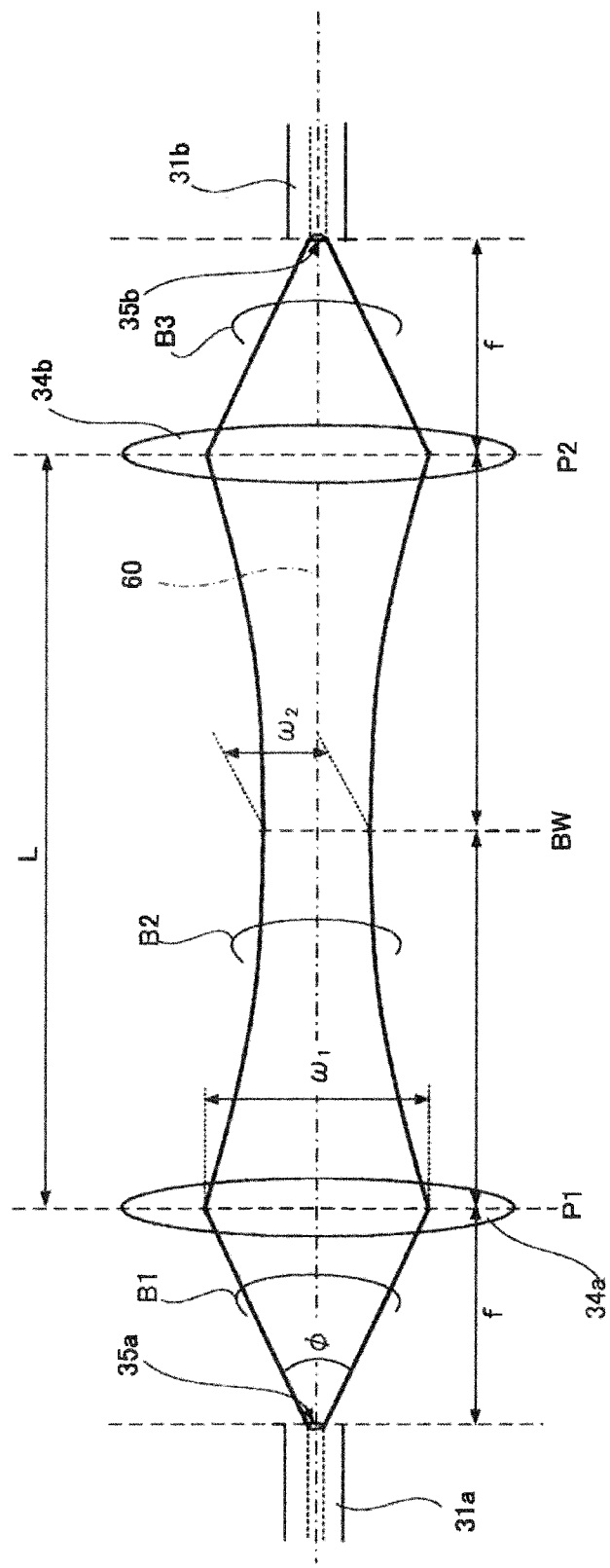
FIG. 5 is a view for illustrating an optical characteristic of optical fiber collimators.

First, a limit of the wavelength selection characteristic, which is set due to the optical characteristic of the optical fiber collimator, is described. FIG. 5 is a view for illustrating the optical characteristic of the optical fiber collimator, and FIG. 6 is a graph for showing a relationship between the optical characteristic of the optical fiber collimator and the wavelength selection characteristic of the interference filter.

As illustrated in FIG. 5, a light beam B1 exiting from the open end 35a of the input-side fiber 31a travels rearward at a predetermined angular aperture φ and is shaped into a parallel beam B2 through the input-side lens 34a to travel rearward. A beam spot diameter of the parallel beam B2 gradually decreases from a maximum diameter ω1 at a main plane position P1 of the input-side lens 34a to a minimum diameter ω2 at a beam waist position BW. After that, the beam spot diameter gradually increases, and the parallel beam B2 reaches the output-side collimator 3b. Then, the parallel beam B2 incident on the output-side lens 34b is coupled to the open end 35b of the output-side fiber 31b as a convergent beam B3.

In the first embodiment, two interference filters are arranged at any front position and rear position on an optical path of the parallel beam B2 having a gradually changing beam spot diameter. Thus, the incident light has a different divergence angle depending on the position at which each of the interference filters is arranged, specifically, the position on the front side or the position on the rear side. For example, in FIG. 5, in an optical system in which a focal length f of each of the collimate lenses (34a, 34b) is 1.8 mm, and a distance L between the main planes (P1-P2) of the collimate lenses (34a, 34b) of the optical fiber collimators (3a, 3b) on the input side and on the output side is equal to 30 mm, the divergence angle at a position on the front side and a position on the rear side of the beam waist position BW, each being apart from the beam waist position BW by 5 mm, is 0.015 degree. The divergence angle at a position on the front side and a position on the rear side of the beam waist position BW, each being apart from the beam waist position BW by 10 mm, is 0.03 degree. As described above, the divergence angle is doubled only by shifting the interference filters respectively to the front side and the rear side by 5 mm.

Figure 6:
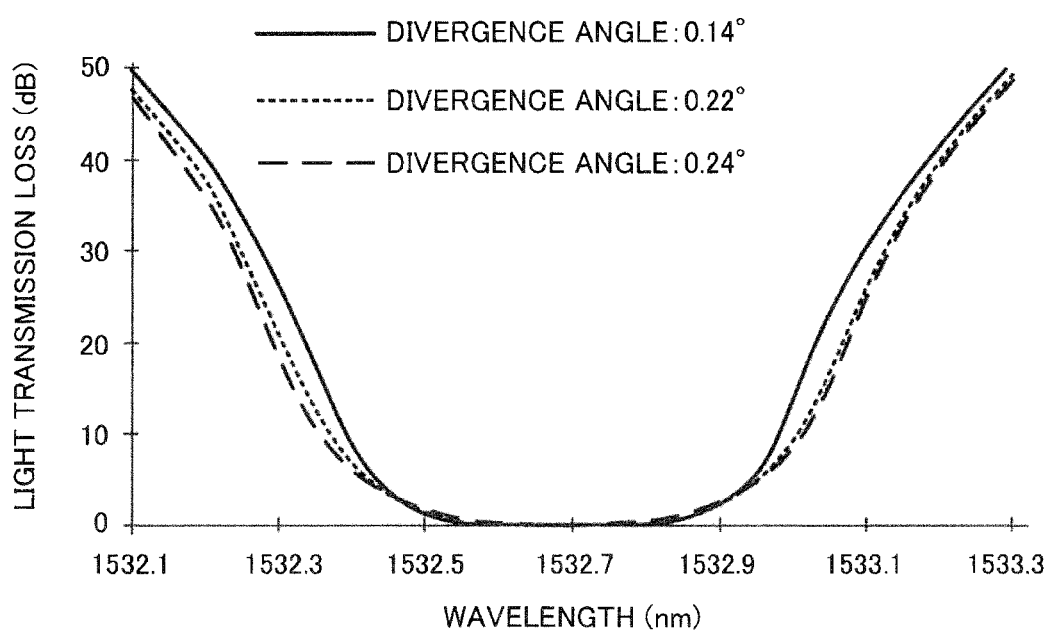
FIG. 6 is a graph for showing divergence-angle dependence of a wavelength selection characteristic in an interference filter.
Figure 7:
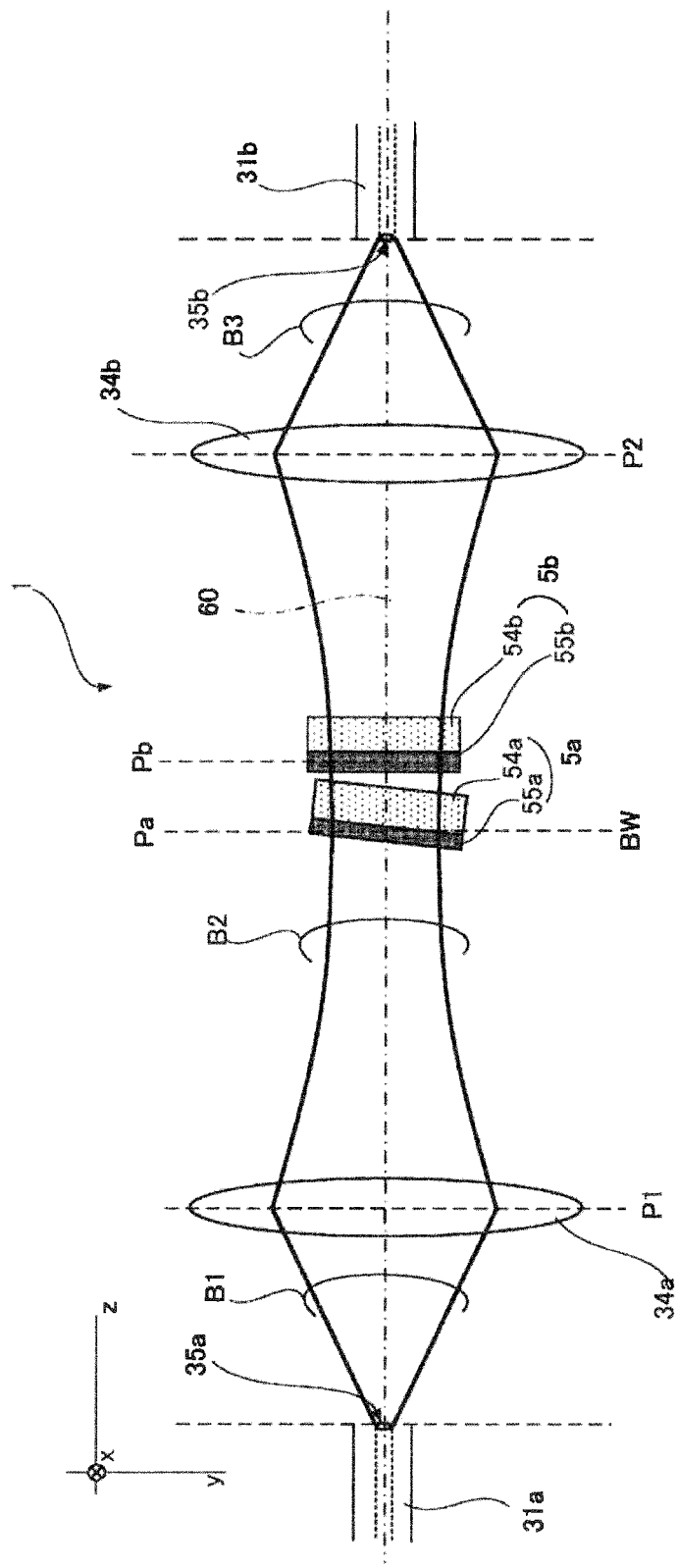
FIG. 7 is a view for illustrating a problem caused due to a structure of the interference filters and an optical characteristic of each of the optical fiber collimators in an interference filter module.

In FIG. 6, the wavelength selection characteristic for one interference filter when the divergence angle is used as a parameter is shown. As shown in FIG. 6, it is understood that the wavelength selection characteristic of the interference filter deteriorates as the divergence angle increases. A relationship between the divergence angle and the wavelength selection characteristic becomes apparent based on the structure of the interference filter. More specifically, it is desired that the interference filter be arranged in the vicinity of the beam waist position at which the divergence angle theoretically becomes zero degree so as to obtain a more excellent wavelength selection characteristic. However, the interference filter has such a structure that the interference film is laminated on the substrate, and a thickness of the substrate is significantly larger than that of the interference film. In the first embodiment, a thickness of the interference film is 52 μm for the substrate having the thickness of 1.4 mm. The substrate does not contribute to the wavelength selection characteristic. In FIG. 7, a mechanism of deterioration of the wavelength selection characteristic due to the structure of the interference filter and the optical characteristic of the optical fiber collimator described above is illustrated. In this case, a longitudinal cross section corresponding to the yz plane of the interference filter module 1 according to the first embodiment is illustrated in a simplified manner. Laminate structures of the two interference filters (5a, 5b), each including a substrate (54a, 54b) and an interference film (55a, 55b), are illustrated in an exaggerated manner. As illustrated in FIG. 7, for the interference filter 5a on the front side, when the two interference filters (5a, 5b) are arranged on the front side and on the rear side in series, for example, a position of the interference film 55a (hereinafter also referred to as "film position Pa") can be substantially matched with the beam waist position BW at which the divergence angle is small. However, for the interference filter 5b on the rear side, a film position Pb is located on the rear side with respect to a position apart by the thickness of the substrate 54a of the interference filter 5a on the front side. Thus, the light beam B2 is incident on the interference filter 5b at a position with a large divergence angle. That is, the wavelength selection characteristic deteriorates due to the thickness of the substrate (54a, 54b). It is certainly conceivable to reduce the thickness of the substrate. However, an advanced technology is required to manufacture a thin substrate. Thus, manufacturing cost of the interference filters increases. Further, a certain thickness is required to ensure strength of the substrate. Thus, in reality, a thickness of about 1 mm is required as stated in the first embodiment. Further, in view of size of each of the filter holding portions, the divergence angle further increases for at least one of the interference filters.

Figure 8:
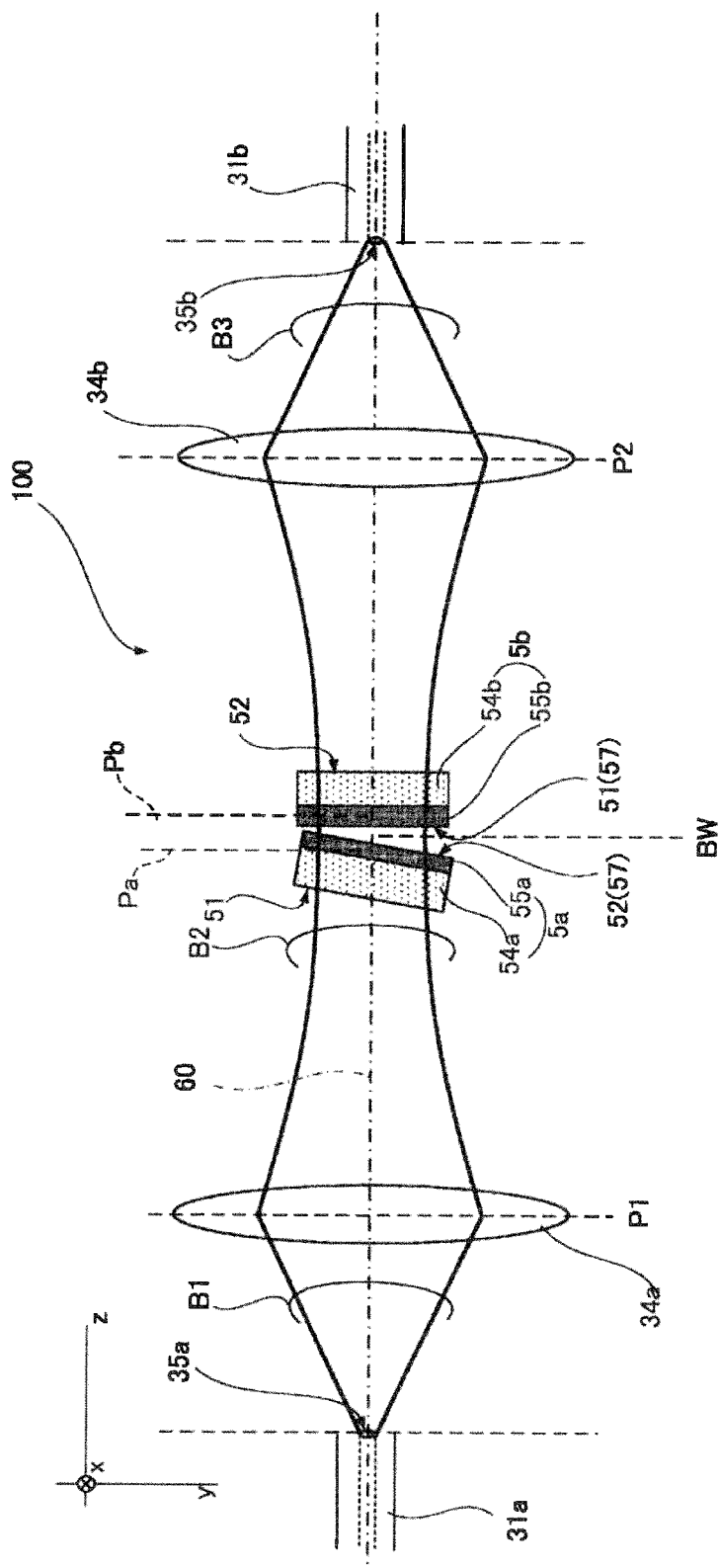
FIG. 8 is a view for illustrating a schematic structure of an interference filter module according to a second embodiment of the present invention.

Thus, as the second embodiment, an interference filter module capable of suppressing the deterioration of the wavelength selection characteristic due to the divergence angle without reducing the thickness of the substrate is provided. FIG. 8 is a schematic view of an interference filter module 100 according to the second embodiment. Herein FIG. 8 also, a longitudinal cross section corresponding to the yz plane is illustrated in a simplified manner so as not to include, for example, the casing. As illustrated in FIG. 8, in the interference filter module 100 according to the second embodiment, out of the two interference filters (5a, 5b) arranged on the front side and on the rear side in series, the interference film 55a of the interference filter 5a on the front side is oriented rearward, and the interference film 55b of the interference filter 5b is oriented forward. In other words, the two interference filters (5a, 5b) are arranged so that the interference films (55a, 55b) face each other. With the arrangement described above, the film positions (Pa, Pb) of the two interference filters (5a, 5b) can be set extremely close to each other. As a result, the light beam can be incident on the interference filters with substantially the same divergence angle.

In the interference filter module 100 according to the second embodiment, when the interference filters (5a, 5b) are arranged on the front side and on the rear side at equal distances apart from the beam waist position BW, the divergence angles reliably become the same. As a result, a symmetric wavelength selection characteristic can be obtained. This means that a wavelength in a target wavelength band can be reliably transmitted with extremely high accuracy. Thus, the arrangement described above is preferred. Further, when the film positions (Pa, Pb) of the two interference filters (5a, 5b) are set as close as possible to the beam waist position BW, the divergence angle, which may affect the wavelength selection characteristic, can be minimized. Thus, the arrangement described above is further preferred. More specifically, when the interference filters (5a, 5b) are arranged on the front side and on the rear side of the beam waist position BW at equal distances apart from the beam waist position BW so that the interference films (55a, 55b) are opposed to (face with) each other and are respectively held at the predetermined incident angles (θ1, θ2), the interference filters are arranged in proximity to each other so that film surfaces of the interference films (55a, 55b) are not brought into contact with each other.

Each of the interference films (55a, 55b) is extremely thin. Thus, each of the film positions (Pa, Pb) substantially matches with a position of a film surface 57. In the interference filter module 1 according to the first embodiment, when the two interference filters (5a, 5b) are arranged so that the interference films (55a, 55b) are located at the same distance apart from the beam waist position BW, mounting positions of the filter holding portions (4a, 4b) in the main body portion 21 of the casing 2 and positions of the interference filters (5a, 5b) relative to the filter holding portions (4a, 4b) are required to be set in consideration of the thickness of each of the substrates (54a, 54b). In addition, the thickness of each of the substrates (54a, 54b) of the interference filters (5a, 5b) may change through post-processing such as polishing. Thus, it is difficult to adjust relative arrangement between the two interference filters (5a, 5b) with high accuracy. Meanwhile, in the interference filter module 100 according to the second embodiment, the two interference filters (5a, 5b) are arranged so that the film surfaces 57 face each other. Thus, the two interference filters (5a, 5b) can be arranged without consideration of the thickness of each of the substrates (54a, 54b).

Figure 9A:
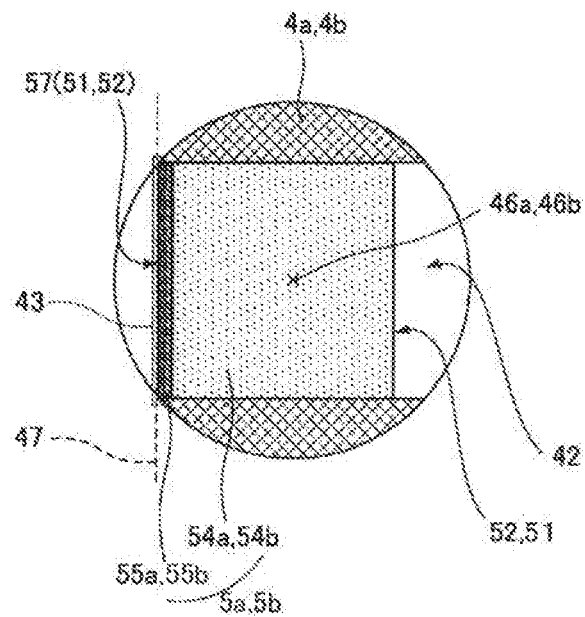
FIG. 9A and FIG. 9B are sectional views for illustrating examples of a method of adjusting a position of a film surface of each interference filter in the interference filter module according to the second embodiment.
Figure 9B:
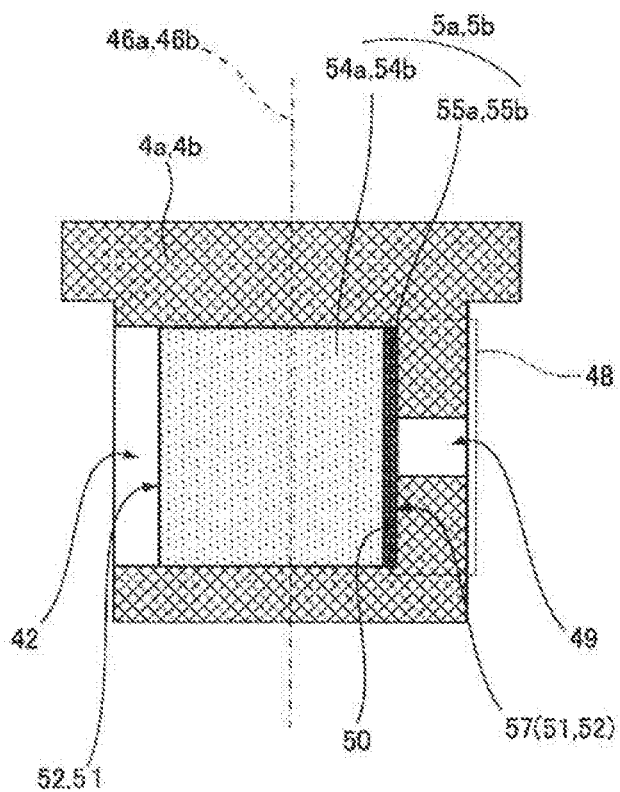

When the interference filter (5a, 5b) is accommodated in the trunk portion 41 of the filter holding portion (4a, 4b) having the cylindrical shape as in the interference filter module 1 according to the first embodiment, which is illustrated in FIGS. 1A and 1B, a position of the film surface 57 is adjusted also relative to the filter holding portion (4a, 4b). In FIGS. 9A and 9B, an adjustment method and an adjustment structure for the position of the film surface 57 relative to the filter holding portion (4a, 4b) are illustrated. For example, FIG. 9A is a transverse sectional view when the filter holding portion (4a, 4b) is taken along a plane orthogonal to the rotation axis (46a, 46b). As illustrated in FIG. 9A, the film surface 57 is only required to be matched with an end surface 47 of the opening 43 of the filter accommodating portion 42. Further, FIG. 9B is a longitudinal sectional view containing the rotation axis (46a, 46b) when the filter holding portion (4a, 4b) is cut so as to halve the opening 43 of the filter accommodating portion 42. As illustrated in FIG. 9B, the filter accommodating portion 42 is only required to be formed to have a closed end and a hole 49 for passage of the optical path therethrough is only required to be formed in a bottom portion 48. When the film surface is arranged so as to be held in contact with an inner surface 50 of the bottom portion 48, the interference filter (5a, 5b) is arranged so that the film surface 57 thereof has a predetermined positional relationship relative to the filter accommodating portion 42. In any case, when the thickness of the substrate (54a, 54b) for the thin interference film (55a, 55b) is taken into consideration, the arrangement of the interference filters so that the film surfaces (57-57) face each other is the most effective measure to reduce the divergence-angle dependence of the selective wavelength.

Other Embodiments

In the first embodiment, two interference filters are used. However, a plurality of interference filters may be used as long as the number of interference filters is an even number. The interference filters, which are in the same order when respectively counted from the front side and from the rear side, are only required to be held so as to be rotatable about one axis and another axis, which are orthogonal to the fore-and-aft direction and are orthogonal to each other. It is apparent that the axes orthogonal to each other are not required to be the x axis and the y axis. For a pair of interference filters in different orders when respectively counted from the front side and the rear side, directions of the rotation axes may be different. For example, in an interference filter module including four interference filters, when two interference filters on a front end side and a rear end side are held so as to be rotatable about the x axis and the y axis, respectively, directions of rotation axes of two interference filters on the inner side are not required to match with the x-axis direction and the y-axis direction as long as the interference filters on the inner side can be held so as to be rotatable about two axes, which are orthogonal to the z axis and are orthogonal to each other.

REFERENCE SIGNS LIST 1, 100 interference filter module
2 casing
3a, 3b optical fiber collimator
4a, 4b filter holding portion
5a, 5b interference filter
21 main body portion
23 vertical hole
31a, 31b optical fiber
34a, 34b collimate lens
41 trunk portion of filter holding portion
42 filter accommodating portion
46a, 46b rotation axis of filter holding portion
51, 52 light incident and exit surface of interference filter
54a, 54b substrate of interference filter
55a, 55b interference film
60 optical axis

The invention claimed is:

1. An interference filter module comprising:
a first optical fiber collimator and a second optical fiber collimator, which have a fore-and-aft direction as a direction of an optical axis and are arranged at a front end and a rear end of a casing so as to be located on said optical axis and opposed to each other; and
2n interference filters arranged inside said casing so as to be located on said optical axis where n is a natural number,
wherein,
said casing includes:
a main body portion having a cylindrical shape; and
2n filter holding portions, each being configured to hold a corresponding one of said interference filters, which are to be mounted into said main body portion,
each of said interference filters includes a substrate and an interference film laminated on said substrate,
when k is a natural number equal to or smaller than n, two interference filters including a k-th interference filter when counted from said front end toward said rear end of said casing and a k-th interference filter when counted from said rear end toward said front end of said casing are determined as a k-th set among said 2n interference filters,
said two interference filters of said k-th set are respectively accommodated in one of said filter holding portions, which is a k-th filter holding portion when counted from said front end toward said rear end of said casing, and in another one of said filter holding portions, which is a k-th filter holding portion when counted from said rear end toward said front end of said casing,
said two filter holding portions corresponding to said k-th filter holding portion when counted from said front end of said casing and said k-th filter holding portion when counted from said rear end of said casing have rotation axes in directions orthogonal to said fore-and-aft direction and are held rotatably in said casing, and said rotation axes of said two filter holding portions are orthogonal to each other, and said two interference filters of said k-th set are arranged so that film surfaces of said interference films of so as to reduce the divergence-angle dependence of a wavelength selectively transmitted by the interference filter module.

2. The interference filter module according to claim 1 comprising said two interference filters, wherein, said two interference filters are arranged so that said film surfaces of said two interference filters are located at equal distances apart from a beam waist position on an optical path formed between said first optical fiber collimator arranged at said front end and said second optical fiber collimator arranged at said rear end, which are opposed to each other.

3. The interference filter module according to claim 2, wherein, said two interference filters are arranged so that said film surfaces of said two interference filters are located as close as possible to said beam waist position while preventing said two interference filters from being in contact with each other.

4. The interference filter module according to claim 2, wherein, a distance between a main plane of a first collimate lens and a main plane of a second collimate lens, said first collimate lens being a lens of said first optical fiber collimator and said second collimate lens being a lens of said second optical fiber collimator, is greater than a sum of a focal length of said first collimate lens and a focal length of said second collimate lens.

5. The interference filter module according to claim 4, wherein, said two interference filters have substantially the same optical characteristic with each other and said focal length of said first collimate lens and said focal length of said second collimate lens are equal to each other.

6. The interference filter module according to claim 1, wherein, a normal of light incident and exit surfaces of each of said interference filters is orthogonal to said rotation axis of a corresponding one of said filter holding portions.

7. The interference filter module according to claim 1, wherein, light incident and exit surfaces of each of said interference filters are configured to be inclined and be fixed at an angle with respect to said optical axis by fixing a corresponding one of said filter holding portions to said main body portion.

* * * * *